(12) United States Patent
Cook et al.

(10) Patent No.: US 6,734,651 B2
(45) Date of Patent: May 11, 2004

(54) BATTERY BACKUP SYSTEM WITH REMOTE SWITCH FOR ACTUATING BACKUP BATTERY

(75) Inventors: Norman Cook, Mooresville, NC (US); Donald Cook, Mooresville, NC (US)

(73) Assignee: SimTech Systems, LLC, Sugar Land, TX (US)

( * ) Notice: Subject to any disclaimer, the term of this patent is extended or adjusted under 35 U.S.C. 154(b) by 22 days.

(21) Appl. No.: 10/163,658

(22) Filed: Jun. 5, 2002

(65) Prior Publication Data

US 2002/0195995 A1 Dec. 26, 2002

Related U.S. Application Data

(60) Provisional application No. 60/296,349, filed on Jun. 6, 2001.

(51) Int. Cl.⁷ .................. H01M 10/44; H01M 10/46
(52) U.S. Cl. .................................. 320/103
(58) Field of Search ............................. 320/103, 104, 320/105, 112, 117, 118, 121, 122

(56) References Cited

U.S. PATENT DOCUMENTS

| | | |
|---|---|---|
| 1,396,541 A | 11/1921 | Thomson |
| 1,653,579 A | 12/1927 | Marko |
| 3,105,909 A | 10/1963 | Jones |
| 3,200,014 A | 8/1965 | Roberts |
| 3,525,414 A | 8/1970 | Copelan |
| 3,859,540 A | 1/1975 | Weiner |
| 3,949,289 A | 4/1976 | Day |
| 3,953,740 A | 4/1976 | Seiter, Jr. |
| 4,004,208 A | 1/1977 | Tamminen |
| 4,350,746 A | 9/1982 | Chambers |
| 4,540,929 A | 9/1985 | Binkley |
| 4,564,797 A | 1/1986 | Binkley |
| 4,684,580 A | 8/1987 | Cramer |
| 4,692,680 A | 9/1987 | Sherer |
| 4,857,820 A | 8/1989 | Tompkins |
| D307,133 S | 4/1990 | Ching, Jr. |
| 5,108,848 A | 4/1992 | Kramer |
| 5,162,164 A | 11/1992 | Dougherty et al. |
| 5,204,610 A | 4/1993 | Pierson et al. |
| 5,316,868 A | 5/1994 | Dougherty et al. |
| 5,448,152 A | 9/1995 | Albright |
| 5,488,283 A | 1/1996 | Dougherty et al. |
| 5,497,066 A | 3/1996 | Drouillard |
| 5,539,388 A | 7/1996 | Modgil |
| 5,549,984 A | 8/1996 | Dougherty |
| 5,637,978 A | 6/1997 | Kellett et al. |
| 5,726,553 A | 3/1998 | Waugh |
| 5,736,793 A | 4/1998 | Jahrsetz et al. |
| 5,793,185 A | 8/1998 | Prelec et al. |
| 5,866,274 A | 2/1999 | Mawston et al. |
| 5,883,491 A | 3/1999 | Silverman |
| 5,977,744 A | 11/1999 | Williams et al. |
| 6,056,076 A | 5/2000 | Bartel et al. |

FOREIGN PATENT DOCUMENTS

GB    2023899 A    1/1980

*Primary Examiner*—Edward H. Tso
(74) *Attorney, Agent, or Firm*—Alvin R. Wirthlin

(57) ABSTRACT

A multiple battery system for a vehicle comprises a primary battery; a reserve battery electrically connectable to the primary battery; and a control unit with a relay switch electrically connected between the primary and reserve batteries. The relay switch is operable to close upon actuation and connect the reserve battery to the primary battery. The control unit also has a receiver electrically connected to the relay switch and is adapted to receive a control signal for actuating the relay switch. A wireless transmitter has a manually actuable switch for sending the control signal to the receiver. With this arrangement, actuation of the transmitter switch causes the control signal to be transmitted to the receiver and actuate the relay switch to connect the reserve battery to the primary battery.

23 Claims, 3 Drawing Sheets

BATTERY BACKUP SYSTEM WITH REMOTE SWITCH FOR ACTUATING BACKUP BATTERY

CROSS-REFERENCE TO RELATED APPLICATIONS

This application claims the benefit of U.S. Provisional Application No. 60/296,349 filed on Jun. 6, 2001.

BACKGROUND OF THE INVENTION

This invention relates to multiple battery systems, and more particularly to rechargeable vehicle battery systems with a primary battery and a reserve or emergency battery that is connectable to a vehicle electric circuit in the event of primary battery failure.

Vehicle battery systems including a primary battery and a reserve battery for starting a vehicle in the event of primary battery failure are known. One such battery system disclosed in U.S. Pat. No. 5,108,848 includes a primary battery and a reserve battery disposed within a common housing. The reserve battery is selectively connectable in parallel with the primary battery through a manually operable switch or relay. A unidirectional charging circuit connects the reserve battery in parallel with the primary battery, permitting charging current to flow into the reserve battery, but preventing drain of the reserve battery during normal vehicle operation. When the primary battery output is insufficient to start a vehicle, the switch is manually operated to connect the reserve battery in parallel with the primary battery. The reserve battery provides sufficient power for the operator to start the vehicle. When the vehicle has been started, the switch is operated to disconnect the reserve battery from the battery circuit. The primary battery is charged in a conventional manner and the reserve battery is recharged through the unidirectional current circuit.

One drawback of prior art manually switched devices is that the reserve battery is engaged and remains engaged even after the vehicle is running if a user does not switch the reserve battery out of the circuit. Consequently, it is difficult for the user to determine whether or not the reserve battery is switched in with the vehicle electrical circuit or switched out. Thus, the originally isolated reserve battery is now subject to the same conditions as the primary battery and may fail along with the primary battery. Accordingly, the reserve battery may not be available to provide the needed starting capacity should the primary battery fail.

Another problem associated with such multiple battery systems involves the location of the manual switch. Typically, the manual switch is either located in the engine compartment or in the passenger compartment of the vehicle. Location of the manual switch in the engine compartment is disadvantageous, especially during inclement weather, or with persons not familiar with the engine compartment and its various components. Location of the manual switch in the passenger compartment can require extra wiring between the engine compartment (where the reserve battery is located) and the passenger compartment. This approach may not be practical in vehicles where the integrity of the firewall between the engine compartment and passenger compartment must be maintained. Accordingly, such hardwired systems may not be easy to retrofit into vehicles that have already been manufactured.

SUMMARY OF THE INVENTION

According to one aspect of the invention, a multiple battery system comprises a primary battery, a reserve battery electrically connectable to the primary battery, and a control unit with a relay switch electrically connected between the primary and reserve batteries. The relay switch is operable to close upon actuation and connect the reserve battery to the primary battery. The control unit also has a receiver electrically connected to the relay switch for receiving a control signal for actuating the relay switch. A transmitter is provided for sending the control signal to the receiver. With this arrangement, actuation of the transmitter causes the control signal to be transmitted to the receiver and actuate the relay switch to thereby connect the reserve battery to the primary battery.

According to a further aspect of the invention, a multiple battery system comprises a primary battery, a reserve battery electrically connectable to the primary battery, and a relay switch electrically connected between the primary and reserve batteries. The relay switch is operable between a closed position wherein the reserve battery is connected to the primary battery and an open position wherein the reserve battery is disconnected from the primary battery to prevent discharge of the reserve battery. A manually actuable switch is operably connected to the relay switch for moving the relay switch to the closed position upon actuation of the manually actuable switch. A timer circuit is operably connected to the relay switch for moving the relay switch to the open position after a predetermined time period.

According to an even further aspect of the invention, a method for temporarily providing reserve battery power to a vehicle having a primary battery and an electrical system connected to the primary battery is provided. The method comprises providing a reserve battery, providing a relay switch between the primary battery and the reserve battery, providing a manually actuable momentary contact switch in communication with the relay switch, actuating the momentary contact switch for a period of time to thereby connect the reserve battery to the primary battery for the period of time, and releasing the momentary contact switch at the end of the period of time to disconnect the reserve battery from the primary battery. Preferably, the electrical system comprises a starter motor, a starter solenoid and an ignition switch adapted for electrical connection to the primary battery. The ignition switch is actuated during the time period to thereby engage the starter solenoid and starter motor. In this manner, the reserve battery can start a vehicle with a discharged main battery.

According to an even further aspect of the invention, a method of conveying a battery back-up system to a customer is provided. The battery backup system has a reserve battery, a control unit connected to the reserve battery and a transmitter for actuating the control unit. The method comprises installing the reserve battery and the control unit in a vehicle to be conveyed, such that the reserve battery is connectable to a main battery of the vehicle through actuation of the control unit, offering the customer an option of purchasing the vehicle battery back-up system, giving the customer the transmitter for actuating the control unit if the customer desires the option, and keeping the transmitter from the customer if the customer refuses the option. In this manner, the reserve battery can only be accessed when the customer buys the option.

BRIEF DESCRIPTION OF THE SEVERAL VIEWS OF THE DRAWINGS

The preferred embodiments of the present invention will hereinafter be described in conjunction with the appended drawings, wherein.

Embodiments of the invention will now be described in greater detail with reference to the drawings, wherein like parts throughout the drawing figures are represented by like numerals.

DETAILED DESCRIPTION OF THE INVENTION

Figure 1:
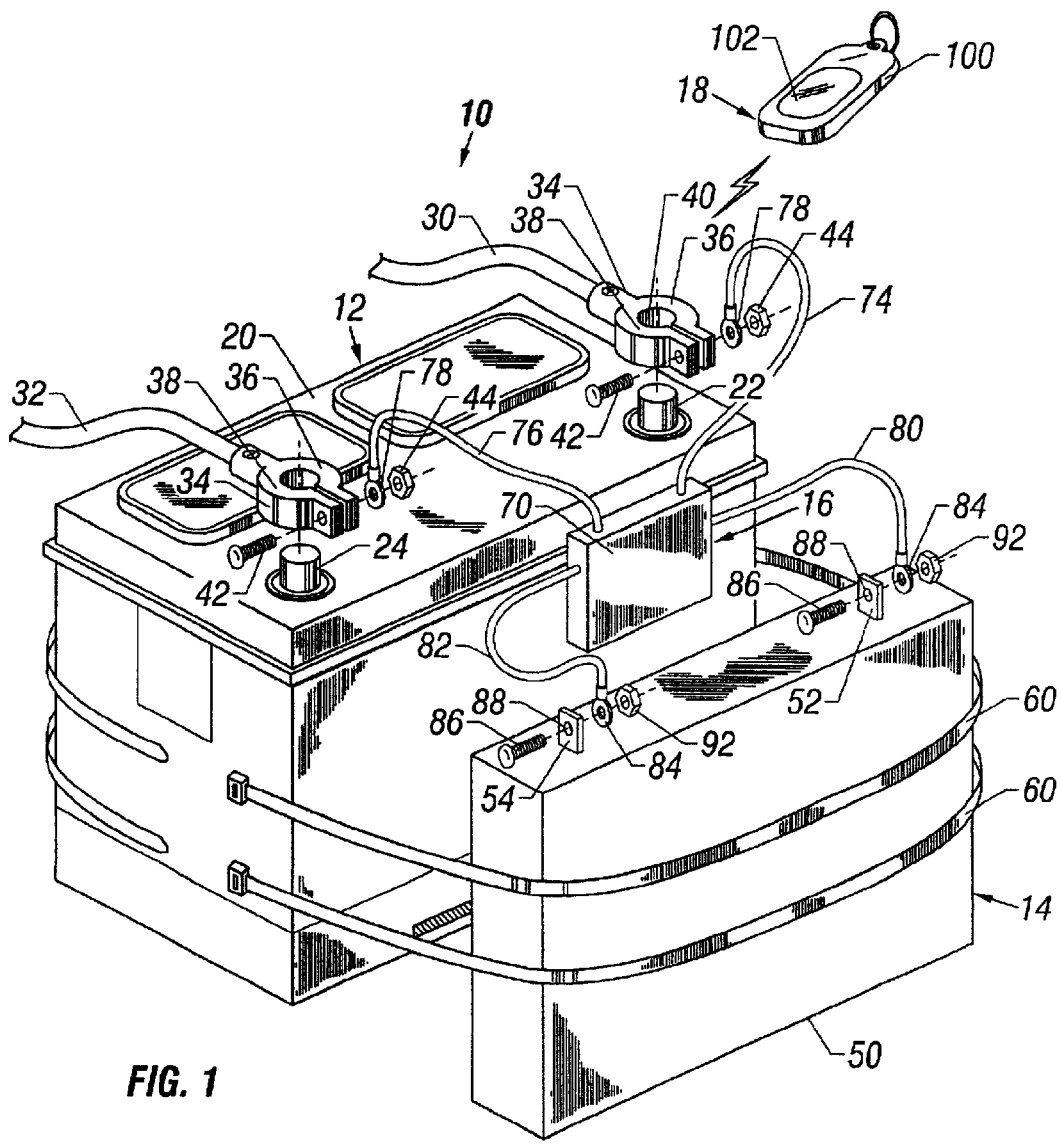
FIG. 1 is an exploded isometric view of a multiple battery system according to one embodiment of the present invention.

Referring now to the drawings, and to FIG. 1 in particular, a multiple battery system 10 includes a primary battery 12, an auxiliary or reserve battery 14, and a control unit 16 electrically connected between the primary battery 12 and reserve battery 14. A portable transmitter 18 is preferably provided for activating and/or deactivating the control unit 16, as will be described in further detail below.

The primary battery 12 is preferably of the lead-acid type and includes a housing 20 with well-known internal components that produce a voltage across a positive terminal post 22 and a negative terminal post 24 that extend out of the housing. For passenger-type vehicles, the primary battery 12 normally produces about twelve volts across the posts and may have a starting power rating from about 300 cold cranking amps (CCA) to 900 CCA or more. The primary battery 12 is connected to electrical circuitry (not shown) of the vehicle through electrical battery cables 30 and 32 that mount to the positive and negative terminal posts 22 and 24, respectively, for providing electrical power to the vehicle electrical circuitry The electrical circuitry may include a starter motor, a starter solenoid, an ignition switch for engaging the starter motor and solenoid with the primary battery, and various vehicle accessories, such as a radio, lights, windows, door locks, and so on, that are connectable to the primary battery through well known switches or other control means.

For top-mounted posts as shown, each cable 30, 32 has a terminal connector 34 with bifurcated arms 36, 38 that define an opening 40 for receiving the battery post therebetween. A threaded bolt 42 extends through openings in the outer free ends of the bifurcated arms 36, 38. A nut 44 threads onto the bolt 42 and forces the arms 36, 38 together for clamping the post between the arms in a well-known manner. For batteries with side posts or other connecting means, it will be understood that different configurations and/or adapters can be provided.

The reserve battery 14 is preferably of the sealed lead-acid type and includes a housing 50 with well-known internal components that produce a voltage across a positive terminal tab 52 and a negative terminal tab 54 that extend out of the housing. For passenger-type vehicles, the reserve battery 14 preferably produces about twelve volts across the posts 52 and 54 for starting the vehicle engine when engaged with the vehicle's electrical circuitry, as will be described in greater detail below. According to one embodiment of the invention, the reserve battery is approximately eight inches wide by six inches high by one inch thick, to give a total reserve battery volume of approximately 48 cubic inches. This relatively small size is ideal for installation in engine compartments of newer vehicles or the like where extra space is limited. It is contemplated however, that a reserve battery with a total volume of approximately 200 cubic inches or less can be used in many vehicles.

The reserve battery 14 is preferably mounted to the primary battery 12 through straps 60, such as nylon ties, that extend horizontally and/or vertically around the batteries 12, 14. Alternatively, the reserve battery 14 may be mounted to the primary battery 12 or vehicle structure with brackets, adhesive, or other mounting means.

The control unit 16 includes a housing 70 and electronic circuitry 72 (FIG. 2) located in the housing 70 for switching the reserve battery 14 into and out of the vehicle's electrical circuitry. A first set of electrical battery cables 74 and 76 extend from the electrical circuitry 72 in the housing 70 to the positive and negative terminal posts 22 and 24, respectively, of the primary battery 12. Preferably, the connection end of each cable 74 and 76 is terminated with a ring connector 78 that fits over one of the bolts 42 between the bolt or nut 44 and its associated terminal connector 34 for electrically connecting the control unit 16 to the primary battery 12. A second set of electrical battery cables 80 and 82 extend from the electrical circuitry 72 in the housing 70 to the positive and negative terminal tabs 52 and 54, respectively, of the reserve battery 14. Preferably, the connection end of each cable 80 and 82 is terminated with a ring connector 84 for receiving a threaded bolt 86. Each threaded bolt 86 extends through one of the ring connectors 84 and a corresponding opening 88 formed in the terminal tabs. A nut 92 is threaded onto each bolt to secure the cables 80 and 82 to the reserve battery 14 and electrically connect the control unit 16 to the reserve battery 14.

Although the battery cables 74, 76, 80 and 82 are described as being connected to their respective batteries through particular connection means, it will be understood that other connection means can be used for mechanically and electrically connecting the cables. Moreover, although the control unit 16 according to the invention is shown with a separate housing, the control unit may alternatively be incorporated into the housing 50 of the reserve battery 14 or into the housing 20 of the primary battery 12.

The provision of a separate housing 50 for the control unit 16 advantageously permits replacement of the primary battery and/or reserve battery should one or both batteries fail or reach the end of their service life. In addition, the separate control unit 16 and reserve battery 14 can be readily moved to another vehicle without modification to the vehicle, other than mounting the control unit and reserve battery as previously described.

The transmitter 18 is preferably a wireless transmitter of the radio frequency type for transmitting a control signal to the control unit 16. The transmitter 18 includes a housing 100, electrical circuitry (not shown) in the housing 100 and a manually actuable button or switch 102 extending out of the housing 100 and connected to the circuitry. Preferably, the switch 102 is a momentary push-button switch that is normally biased to an open position so that the transmitter will only transmit a control signal when the switch 102 is pressed or otherwise actuated. It will be understood that other momentary contact switches, such as rotational, toggle or slide switches, can be used. Actuation of the switch 102 causes one or more control signals to be transmitted via radio frequency from the transmitter 18 to the control unit 16 to thereby switch the reserve battery 14 into and/or out of the vehicle circuitry, as will be described in greater detail below.

According to a further embodiment of the invention, the transmitter 18 can be in the form of a satellite, pager, cellular or digital phone, or other wireless transmitter that is capable of transmitting a control signal to a suitable receiver 110 (FIG. 2) in the control unit.

According to an even further embodiment of the invention, the transmitter can be a hard-wired transmitter, such as a manually actuable switch that is hardwired into a multiplexed circuitry of a vehicle. Actuation of the switch can generate a protocol signal that is transmitted over the circuitry to a receiver 110 (FIG. 2) in the control unit.

Figure 2:
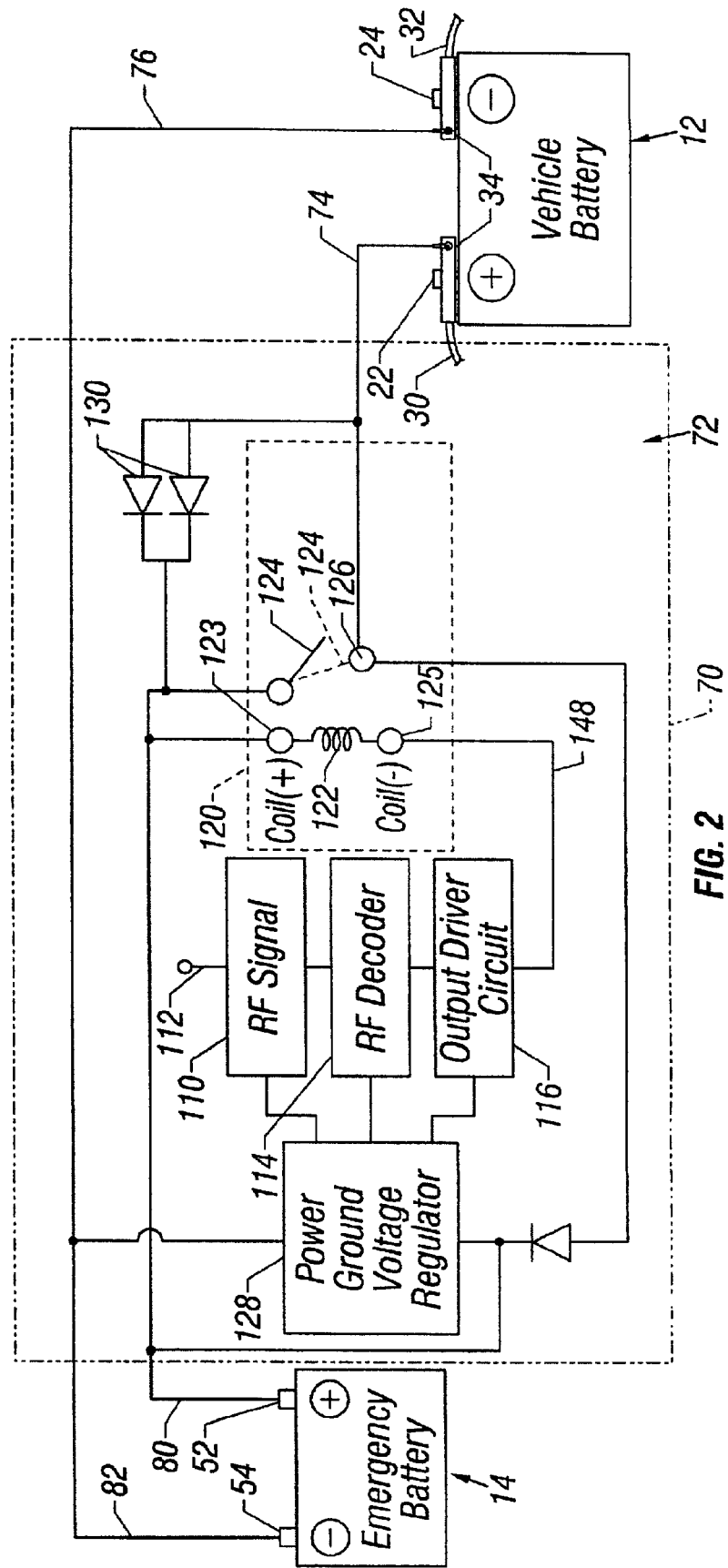
FIG. 2 is a diagrammatic illustration of electrical circuitry of the multiple battery system according to an embodiment of the invention.

With reference now to FIG. 2, the circuitry 72 located in the control unit housing 70 according to a preferred embodiment of the invention includes a receiver 110, such as a radio frequency receiver, and an antenna 112 connected to the receiver for receiving a transmitted signal from the transmitter 18. The transmitted signal is preferably a coded signal that can be generated in the transmitter through well known hardware and/or software encoding techniques to prevent unauthorized operation of the control unit.

A decoder 114, such as a radio frequency decoder, is connected to the receiver 110 for decoding the coded signal in a well known manner to thereby verify that the received signal is authorized. Once decoded, the signal is sent to a driver circuit 116 for controlling operation of a normally open relay switch 120.

The relay switch 120 is preferably of the conventional solenoid type and includes an electric coil 122 with a positive terminal 123 and a negative terminal 125. The coil 122 generates a magnetic field for driving a switch arm 124 toward an electrical contact 126 when actuated to thereby connect the positive terminal 52 of the reserve battery 14 to the positive terminal 24 of the primary battery. The negative terminal 54 of the reserve battery is preferably always connected to the negative terminal 22 of the primary battery. A voltage regulator 128 is preferably connected to the receiver 110, decoder 114, and output driver circuit 116.

With the relay switch 120 in the normally open position, the positive terminal 52 of the reserve battery 14 is connected to the positive terminal 24 of the primary battery 12, preferably through a pair of clamping diodes 130. With the negative terminals of the battery continuously connected and the relay switch 120 in the normally open position, the reserve battery 14 can be charged by the vehicle's electrical system through the diodes 130, which in effect bypass the relay switch 120. When the primary battery 12 discharges to a voltage level lower than the voltage level of the reserve battery 14, such as when lights or other vehicle accessories are left on without the motor running for an extending period of time, the diodes 130 prevent discharge of the reserve battery 14.

When the relay switch 120 is actuated, the switch arm 124 is moved into contact with the electrical contact 126 (as shown in dashed line) to thereby connect the positive battery cables 74 and 80 and bypass the diodes 130 (due to the voltage drop across the diodes) so that the reserve battery 14 can be accessed for starting the vehicle and/or operating vehicle accessories. When the relay switch 120 is deenergized, the diodes 130 permit the reserve battery to recharge and prevent the reserve battery from further discharge. The use of two diodes in parallel is preferred, since it has been found that a single diode having the necessary power requirement (about three Amperes in the preferred embodiment) is more costly than two diodes sharing the same power requirement.

In another embodiment of the invention, the negative battery terminals may also or alternatively be normally disconnected and connected in the same manner as the positive battery terminals through a suitable relay.

Figure 3:
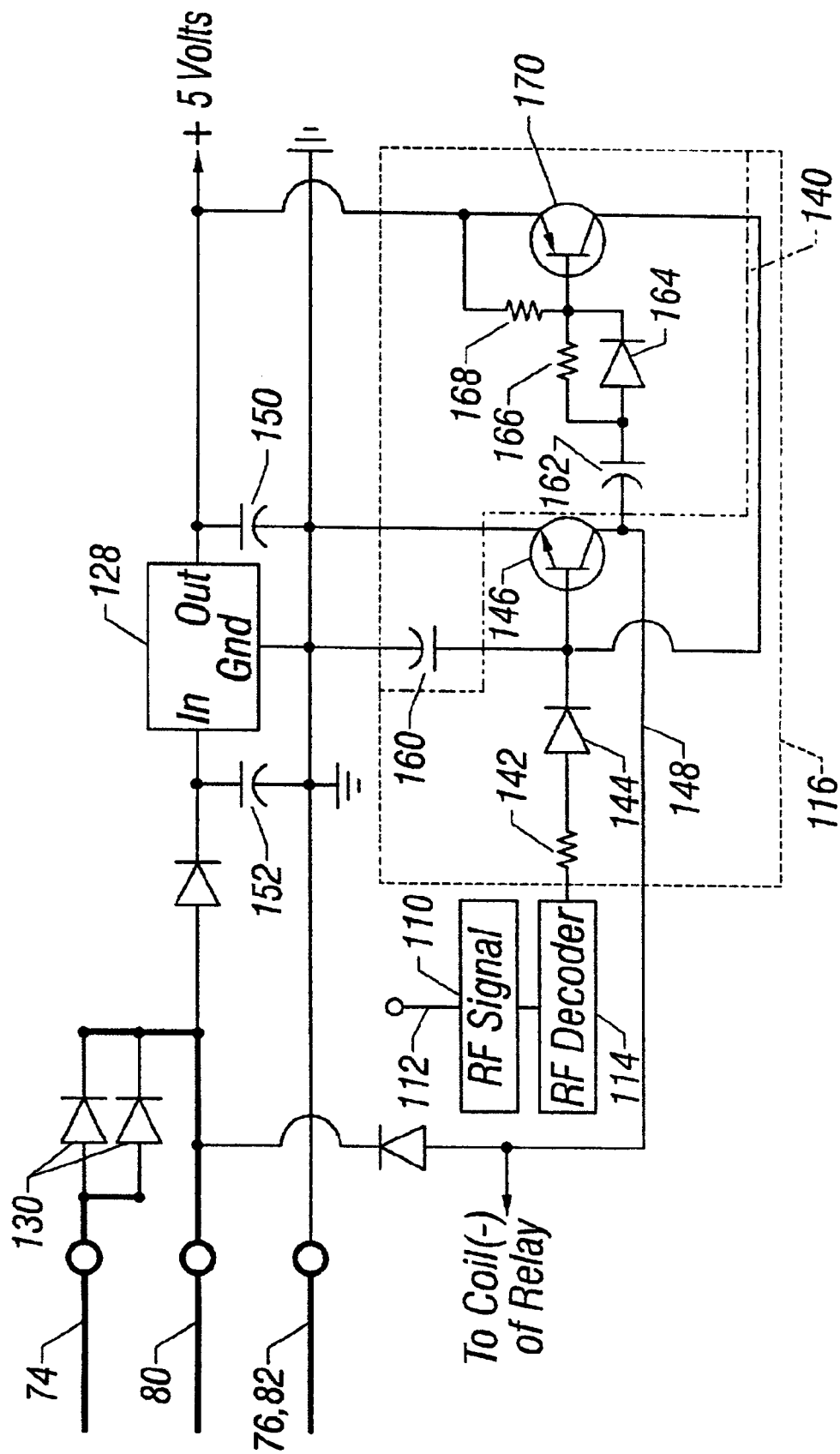
FIG. 3 is a schematic illustration of a portion of the electrical circuitry of FIG. 2 in greater detail.

With reference now to FIG. 3, the driver circuit 116 (shown in dashed line) includes a timer circuit 140 (shown in phantom line) connected to the decoder 114 through a resistor 142, a diode 144, and an NPN transistor 146. An emitter of the transistor 146 is connected to ground, while a collector of the transistor 146 is connected to the negative terminal 125 of the relay coil 122. A filtering capacitor 150 extends between the positive voltage output of the voltage regulator 128 and ground, while a filtering capacitor 152 extends between the positive voltage input of the regulator 128 and ground.

According to an embodiment of the invention, the timer circuit 140 includes a capacitor 160 connected between the base of the transistor 146 and ground, a diode 164 connected to the collector of the transistor 146 through a capacitor 162, a first resistor 166 connected across the diode 164, and a second resistor 168 connected between the first resistor 166 and the collector of a PNP transistor 170. The values of the timer circuit components are preferably selected to create a predetermined time period during which the relay switch 120 remains closed. After the predetermined time period, the relay switch 120 returns to the normally open position to switch the reserve battery 14 out of the vehicle's electrical circuitry. In this manner, further discharge of the reserve battery is prevented. This feature is especially advantageous over the prior art relay switches that must be manually switched from an open position to a closed position prior to cranking the engine and switched again to the open position after the engine starts, since it is no longer necessary for the user to remember if the relay switch as been returned to the open position. In this manner, the reserve battery 14 is not subject to the same charge and discharge conditions of the primary battery 12, and therefore will be ready for use when the primary battery is insufficient for starting the motor and/or operating vehicle accessories.

By way of example, the capacitor 160 can have a value of approximately 47 $\mu$F, the capacitor 162 can have a value of approximately 220 $\mu$F, and the resistors 166 and 168 can each have a value of approximately 51 K$\zeta$ to create a predetermined time period of approximately 25 seconds during which the relay coil 122 is actuated and deenergized. When the capacitor 162 is selected to have a value of approximately 470 $\mu$F, the predetermined time period will be approximately 50 seconds. When the capacitor 162 is selected to have a value of approximately 100 $\mu$F, the predetermined time period will be approximately 12 seconds.

In use, when the user actuates the switch 102 on the transmitter 18, a coded control signal is sent to the receiver 112, which is in turn decoded in the decoder 114 and sent as a positive signal output to the output driver circuit 116. The signal turns on the NPN transistor 146, which in turn connects the negative terminal 125 of the relay coil 122 to ground, thereby causing current to flow through the coil and move the switch arm 124 to the closed position. In this manner, the reserve battery 14 is connected in parallel with the primary battery 12. When the transmitter switch is released, current will continue to flow through the relay coil 122 for a predetermined time period, as established by the timer circuit 116. In particular, a negative voltage will be present at the base of the PNP transistor 170 to turn on the transistor 170 and drive the current from the positive terminal of the voltage regulator 128 to the base of the NPN transistor 146 and the capacitor 160. The amount of time that the transistor 146 remains on is directly dependent on the value of the capacitor 162. With the transistor 146 turned on, the ground connection to the relay coil 122 is maintained for the predetermined time period. In this manner, momentary actuation of the transmitter switch 102 will cause the reserve battery 14 to be connected in parallel with the primary battery 12 for the predetermined time period, which is preferably greater than the momentary actuation time of the transmitter switch 102, and which is preferably long enough to crank the engine a number of times to start the vehicle.

At the end of the predetermined time period, i.e. when the capacitor 162 is sufficiently discharged, the transistor 146 is turned off and the switch arm 124 is returned to the open position, thereby disconnecting the reserve battery from the vehicle's electrical circuitry.

Although a particular timer circuit has been shown and described, it is to be understood that other timer circuits can be used, such as timer circuits using the well-known 555 IC timer, and so on.

Although the transmitter 18 is a wireless transmitter according to one preferred embodiment of the invention, it will be understood that the timer circuit 116 can work equally as well with hard-wired transmitters or other switches where it is desirous to automatically disconnect the reserve battery from the vehicle circuitry.

According to a further embodiment of the invention, the timer circuitry can be eliminated and the button can be continuously actuated by a user during cranking of the engine. Thus, the user will hold the momentary contact switch while turning the vehicle's ignition switch to engage the reserve battery with the starter motor and starter solenoid. Once the vehicle's engine is running, the momentary contact switch can be released to open the relay switch and remove the reserve battery 14 from the vehicle's electrical circuit, with the exception of the charging connection as previously described.

When the timer circuit 116 is left out of the circuitry, release of the transmitter switch 102 causes the transistor 146 to turn off, which in turn causes the switch arm 124 to return to the open position and disconnect the reserve battery from the vehicle's electrical circuitry. In this manner, the user must keep the transmitter switch 102 actuated while cranking the engine of the vehicle.

The term "connect" and its derivatives as used throughout the specification, including the claims, may refer to elements that are directly joined together mechanically and/or electrically, or mechanically and/or electrically joined together through their common connection to something else.

The above-described multiple battery system can also be advantageous for particular business entities, such as car dealerships, where customers can be offered the option and security of an emergency start package, including the reserve battery 14 and control unit 16 when purchasing, leasing or otherwise obtaining a vehicle. Prior to obtaining the vehicle, the dealership can install an emergency start package in the vehicle. The customer can then be offered the option of whether to accept or reject the emergency start package. If the customer accepts the emergency start package, the customer pays a predetermined monetary amount and the transmitter 18 is given to the customer for controlling operation of the emergency start package, as previously described. However, if the emergency start package is refused, the transmitter is withheld so that the customer cannot control operation of the reserve battery. Alternatively, the emergency start package may be removed prior to conveying the vehicle to the customer.

While the invention has been taught with specific reference to the above-described embodiments, those skilled in the art will recognize that changes can be made in form and detail without departing from the spirit and the scope of the invention. Thus, the described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A multiple battery system comprising:
    a primary battery;
    a reserve battery electrically connectable to the primary battery;
    a control unit comprising:
        a relay switch electrically connected between the primary and reserve batteries, the relay switch being operable to close upon actuation and connect the reserve battery to the primary battery; and
        a wireless receiver electrically connected to the relay switch, the receiver being adapted to receive a control signal for actuating the relay switch; and
    a wireless transmitter with a manually actuable switch for sending the control signal to the receiver upon actuation of the switch;
    whereby actuation of the wireless transmitter switch causes the control signal to be transmitted to the receiver and actuate the relay switch to thereby connect the reserve battery to the primary battery.

2. A multiple battery system according to claim 1, wherein the relay switch connects the reserve battery in parallel with the primary battery.

3. A multiple battery system according to claim 1, and further comprising a timer circuit operably connected between the receiver and the relay switch for deactivating the relay switch after a predetermined time period to prevent further discharge of the reserve battery.

4. A multiple battery system according to claim 3, and further composing a charging circuit for charging the reserve battery when the relay switch is open.

5. A multiple battery system according to claim 1, and further comprising a charging circuit for charging the reserve battery when the relay switch is open.

6. A multiple battery system according to claim 5, wherein die charging circuit comprises a plurality of diodes connected in parallel across the relay switch to thereby permit charging of the reserve battery and prevent discharging of the reserve battery when the relay switch is open.

7. A multiple battery system according to claim 1, wherein the transmitter switch comprises a momentary contact switch to thereby prevent transmission of the control signal during non-use.

8. A multiple battery system according to claim 1, and further comprising means for manually actuating the transmitter switch for a period of time to thereby connect the reserve battery to the primary battery for the period of time.

9. A multiple battery system according to claim 1, wherein at least the reserve battery and the control unit comprise separate housings.

10. A multiple battery system according to claim 9, wherein the reserve battery housing is dimensioned to have a volume up to approximately 200 cubic inches.

11. A multiple battery system according to claim 1, wherein the primary battery, the reserve battery, the control unit and the transmitter comprise, separate housings.

12. A multiple battery system according to claim 11, wherein the control unit comprises a first set of electrical wires extending to opposite terminals of the main battery and a second set of electrical wires extending to corresponding terminals of the reserve battery.

13. A multiple battery system according to claim 1, wherein the control unit is electrically connected to the reserve battery for operating the control unit when the primary battery is discharged.

14. A multiple battery system comprising:

a primary battery;

a reserve battery electrically connectable to the primary battery;

a relay switch electrically connected between the primary and reserve batteries, the relay switch being operable between a closed position wherein the reserve battery is connected to the primary battery and an open position wherein the reserve battery is disconnected from the primary battery to prevent discharge of the reserve battery;

a manually actuable switch operably connected to the relay switch for moving the relay switch to the closed position upon actuation of the manually actuable switch; and a timer circuit operably connected to the relay switch for moving the relay switch to the open position after a predetermined time period that beans when the manually actuable switch is actuated to prevent further discharge of the reserve battery.

15. A multiple battery system according to claim 14, wherein the manually actuable switch is a momentary contact switch to thereby prevent operation of the relay switch during non-use.

16. A multiple battery system according to claim 14, wherein the relay switch connects the reserve battery in parallel with the primary battery.

17. A multiple battery system according to claim 14, and further comprising a charging circuit for charging the reserve battery when the relay switch is open.

18. A multiple battery system according to claim 17, wherein the charging circuit comprises a plurality of diodes connected in parallel across the relay switch to thereby permit charging of the reserve battery and prevent discharging of the reserve battery when the relay switch is in the open position.

19. A multiple battery system according to claim 14, wherein the relay switch and the manually actuable switch are electrically connected to the reserve battery for operating relay switch when the primary battery is discharged.

20. A multiple battery system according to claim 14, wherein at least the reserve battery and the control unit comprise separate housings.

21. A multiple battery system according to claim 20, wherein the reserve battery housing is dimensioned to have a volume up to approximately 200 cubic inches.

22. A method for temporarily providing reserve battery power to a vehicle having a primary battery and an electrical system connected to the primary battery, the method comprising:

providing a reserve battery;

providing a relay switch between the primary battery and the reserve battery;

providing a manually actuable momentary contact switch in communication with the relay switch;

actuating the momentary contact switch for a period of time to thereby actuate the relay switch and connect the reserve battery to the primary battery for the period of time; and releasing the momentary contact switch at the end of the period of time to disconnect the reserve battery from the primary battery.

23. A method according to claim 22, wherein the electrical system comprises a starter motor, a starter solenoid and an ignition switch adapted for electrical connection to the primary battery, and further comprising actuating the ignition switch during the period of time to thereby engage the starter solenoid and starter motor with the reserve battery.

* * * * *